US007719551B2

(12) United States Patent
Aoki et al.

(10) Patent No.: US 7,719,551 B2
(45) Date of Patent: *May 18, 2010

(54) IMAGE DISPLAYING METHOD, IMAGE DISPLAYING DEVICE, AND CONTRAST-ADJUSTING CIRCUIT FOR USE THEREWITH

(75) Inventors: Hiroshi Aoki, Yokohama (JP); Ryo Hasegawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/751,624

(22) Filed: May 21, 2007

(65) Prior Publication Data

US 2007/0216816 A1 Sep. 20, 2007

Related U.S. Application Data

(63) Continuation of application No. 10/411,791, filed on Apr. 10, 2003, now Pat. No. 7,227,559.

(30) Foreign Application Priority Data

Aug. 22, 2002 (JP) ............................ 2002-241579

(51) Int. Cl.
*G09G 5/10* (2006.01)
*H04N 5/68* (2006.01)

(52) U.S. Cl. ......................... 345/690; 345/214; 345/89; 348/379; 348/603

(58) Field of Classification Search ................. 345/690, 345/204, 102, 87, 89, 214; 348/672, 678, 348/E5.119, E9.053, 377, 379, 674, E5.073
See application file for complete search history.

(56) References Cited

U.S. PATENT DOCUMENTS 4,811,101 A * 3/1989 Yagi ............................ 348/696
4,812,903 A 3/1989 Wagensonner et al.
5,210,610 A * 5/1993 Kanashiki et al. ........... 348/672
5,345,277 A 9/1994 Blankevoort et al.
5,406,336 A 4/1995 Harlos et al.
5,546,134 A 8/1996 Lee
6,634,757 B2 * 10/2003 Asakawa ............. 348/E17.005
6,654,028 B1 11/2003 Yamakawa
6,795,053 B1 * 9/2004 Funamoto et al. ........... 345/102
6,950,111 B2 9/2005 Kagawa et al.
7,126,591 B2 * 10/2006 Kagawa et al. .............. 345/204
7,227,559 B2 * 6/2007 Aoki et al. .................. 345/690

FOREIGN PATENT DOCUMENTS

JP 04-010784 A 1/1992

(Continued)

*Primary Examiner*—Kevin M Nguyen
(74) *Attorney, Agent, or Firm*—Townsend and Townsend and Crew LLP

(57) ABSTRACT

A system provides an image displaying technique that provides stable high contrast even in an area having high brightness. Based on information about an average brightness level of a digital luminance signal, black-correction processing which decreases a brightness level by offsetting the brightness level to the minus side, and increase processing which increases a contrast gain within a dynamic range, are performed for an analog luminance signal or a digital luminance signal, enabling improvement in contrast even where brightness is intense.

12 Claims, 5 Drawing Sheets

FOREIGN PATENT DOCUMENTS

| | | | |
|---|---|---|---|
| JP | 04-223691 | A | 8/1992 |
| JP | 08-138558 | A | 5/1996 |
| JP | 08-139968 | A | 5/1996 |
| JP | 09-154042 | A | 6/1997 |
| JP | 09-219830 | A | 8/1997 |
| JP | 10-208637 | A | 8/1998 |
| JP | 2000-172218 | A | 6/2000 |

* cited by examiner

IMAGE DISPLAYING METHOD, IMAGE DISPLAYING DEVICE, AND CONTRAST-ADJUSTING CIRCUIT FOR USE THEREWITH

CROSS-REFERENCES TO RELATED APPLICATIONS

The present application is a Continuation application of U.S. application Ser. No. 10/411,791, filed Apr. 10, 2003, which in turn is related to and claims priority from Japanese Patent Application No. 2002-241579, filed Aug. 22, 2002, both of which are incorporated by reference herein in their entirety for all purposes.

BACKGROUND OF THE INVENTION

The present invention relates to an image displaying technique that converts an analog video signal to a digital video signal to display an image.

Image displaying devices, which use a fixed pixel device such as a plasma display panel (PDP) or a liquid crystal display panel (LCD), generally have low contrast compared to image displaying devices that use a cathode-ray tube. Conventional measures to improve contrast in PDPs include at least a technique for increasing the light-emitting efficiency of phosphor and a technique for improving control of the panel. They are described in detail, for example, in Japanese Patent Application Laid-Open No. Hei 10-208637 and Japanese Patent Application Laid-Open No. Hei 8-138558. An example of a technique for adjusting video contrast in a television receiver includes the technique described in Japanese Patent Application Laid-Open No. Hei 4-10784. Japanese Patent Application Laid-Open No. Hei 4-10784 describes a technique in which the maximum value, the minimum value, and the mean of a digital signal is converted from a video signal before storing the values. Based on the result of the detection and calculation, amplification of the video signal is performed to improve contrast.

BRIEF SUMMARY OF THE INVENTION

For image displaying devices that use a fixed pixel devices such as a PDP or an LCD, higher contrast is required. The present invention is particularly devised to obtain stable high contrast even in an area of intense brightness. To improve the contrast, the present invention provides a technique for displaying an image. Based on information about the average brightness level of a digital luminance signal, for a corresponding analog luminance signal or a digital luminance signal, so-called black-correction processing is performed to decrease the brightness level. This is performed according to a predetermined quantity of correction in response to the average brightness level. In addition processing that increases contrast gain within the range of a margin of a dynamic range is performed; thereby improving video contrast where the average brightness level is comparatively high.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

Although we have shown and described several embodiments in accordance with our invention, it should be understood that disclosed embodiments can be changed or modified without departing from the scope of the invention. Therefore, the present invention is not bound by the details shown and described herein but should be understood to cover all such changes and modifications that fall within the scope of the appended claims. Embodiments of the present invention are described below with reference to the drawings.

Figure 1:
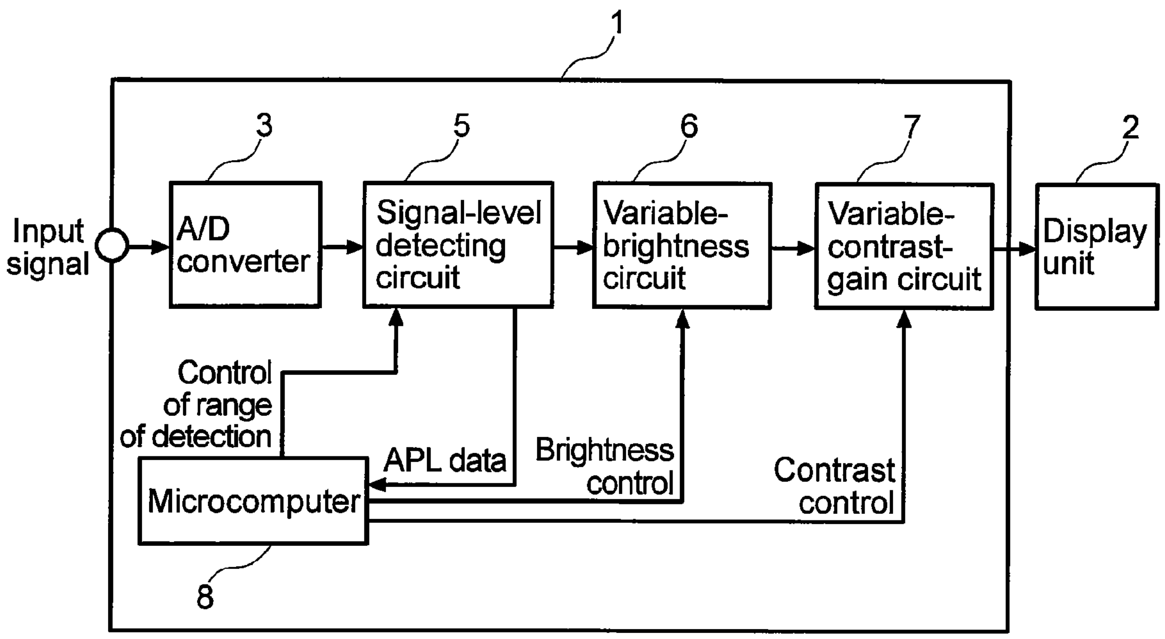
FIG. 1 is a basic configuration diagram illustrating a first embodiment according to the present invention.
Figure 2:
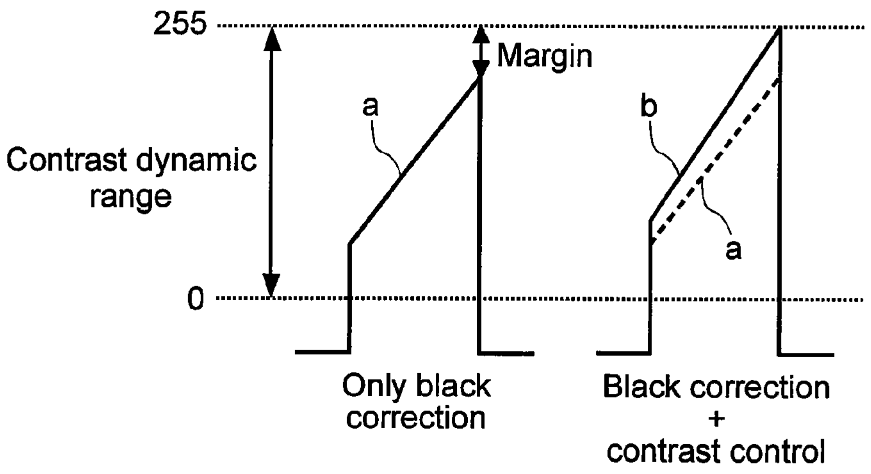
FIG. 2 is an explanatory diagram illustrating a contrast adjusting operation for the configuration shown in FIG. 1.
Figure 3:
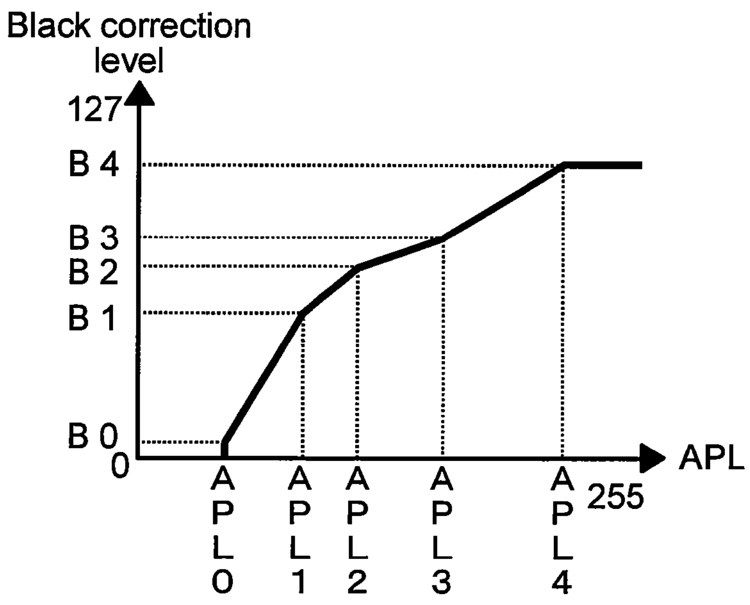
FIG. 3 is an explanatory diagram illustrating the relationship between an average brightness level and a black-correction level in contrast adjustment.
Figure 4:
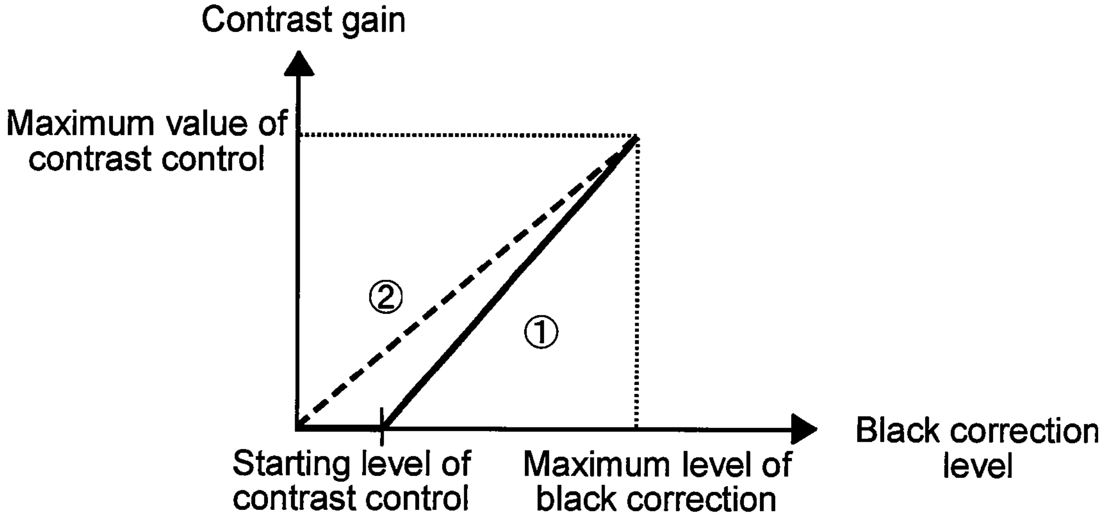
FIG. 4 is an explanatory diagram illustrating the relationship between a black-correction level and a contrast gain in a contrast adjustment operation.
Figure 5:
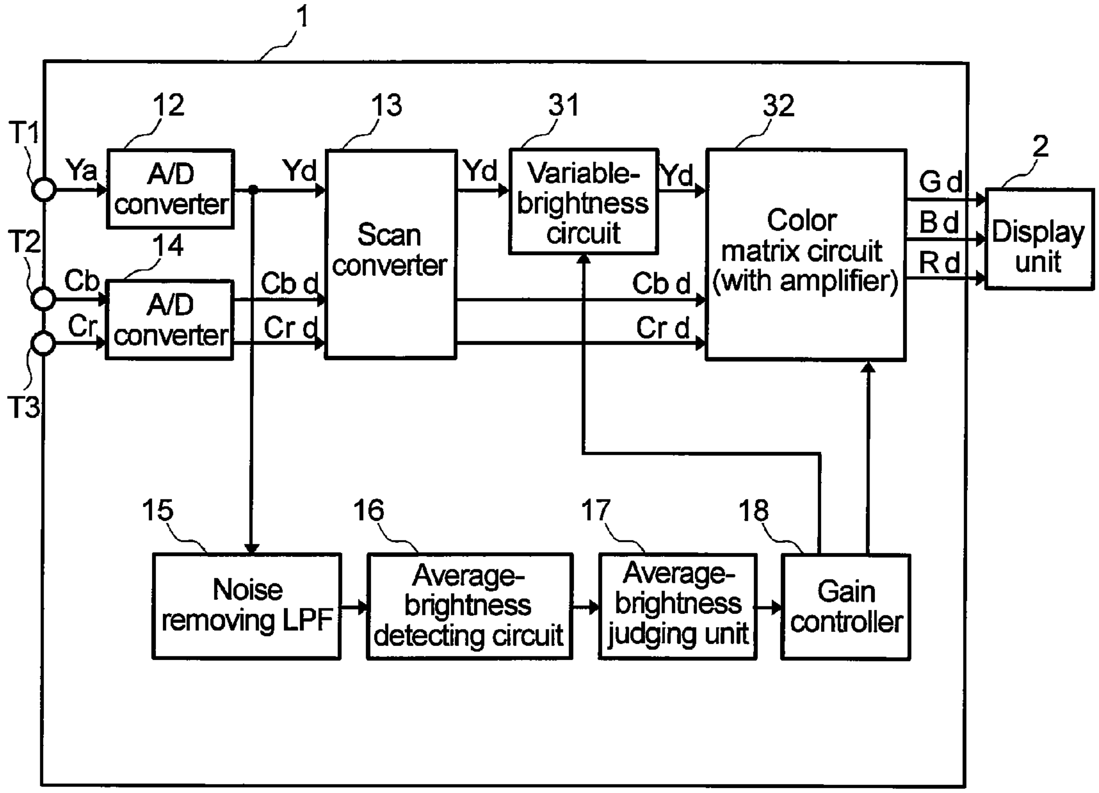
FIG. 5 is a diagram illustrating a specific example of the configuration shown in FIG. 1.

FIGS. 1 through 5 are explanatory diagrams illustrating a first embodiment of the present invention. FIG. 1 is a basic configuration diagram illustrating an image displaying device which mainly comprises a contrast-adjusting circuit. FIG. 2 illustrates a contrast-adjusting operation within a dynamic range. FIG. 3 illustrates the relationship between an average brightness level and a black-correction level. FIG. 4 illustrates the relationship between a black-correction level and a contrast gain. FIG. 5 is a diagram of the configuration of the embodiment shown in FIG. 1. This embodiment is an example of a circuit configuration in which a digital luminance signal is offset within a dynamic range to decrease the brightness level; that is, black-correction processing is performed before increasing a contrast gain to improve contrast.

FIG. 1 shows a contrast-adjusting circuit unit 1, a display unit 2 for displaying an image by a contrast-adjusted signal, an A/D converter 3 for converting an inputted analog luminance signal into a digital signal, a signal-level detecting circuit 5 for detecting the average brightness level of a digital luminance signal obtained within a given period, a variable-brightness circuit 6 that offsets a digital luminance signal to change the brightness level, a variable-contrast-gain circuit 7 for changing the contrast gain of a digital luminance signal (the brightness level of which has been changed), and a microcomputer 8 as a control circuit to control signal-level detecting circuit 5, variable-brightness circuit 6, and variable-contrast-gain circuit 7 based on information about the detected average brightness level.

Microcomputer 8 identifies a brightness area corresponding to the detected average brightness level, then generates and outputs a control signal corresponding to the result. An inputted analog luminance signal is converted to a digital luminance signal by A/D converter 3. The digital luminance signal is then inputted into signal-level detecting circuit 5. Signal-level detecting circuit 5 detects the average brightness level of the digital luminance signal obtained during a video period, for example, in one field or in one frame. Information (a signal) about the detected average brightness level is supplied to microcomputer 8. Microcomputer 8 identifies a brightness area corresponding to the average brightness level based on the received information about the average brightness level, then generates and outputs a control signal based on the result. The control signal is provided to signal-level detecting circuit 5, variable-brightness circuit 6, and variable-contrast-gain circuit 7. The control signal controls the range of detection by signal-level detecting circuit 5. In variable-brightness circuit 6, in this example, the control signal controls black correction for a digital luminance signal within the range of an average brightness level greater than or equal to a given value. More specifically, the control signal controls a digital luminance signal, the average brightness level of which is greater than or equal to the given value, so that the digital luminance signal is offset to the minus side. In addition, for variable-contrast-gain circuit 7, the control signal is associated with a level of black correction in variable-brightness circuit 6, and is used to control the contrast gain of a digital luminance signal within the range of an average brightness level greater than or equal to a given values so that the contrast gain is increased within a dynamic range.

Variable-brightness circuit 6 and variable-contrast-gain circuit 7 are controlled by a feedforward method. As described above, performing black-correction processing for a digital luminance signal within the range of an average brightness level greater than or equal to the given value, and increasing a contrast gain within a dynamic range according to a level of the black correction, cause video contrast, particularly contrast on the bright video side, to increase. An increased-contrast video signal is transmitted to display unit 2 where the increased-contrast image having increased contrast is displayed. Note that in this embodiment a control signal is separately output from microcomputer 8 to the color matrix circuit, which converts a digital luminance signal and a digital color-difference signal into digital video signals of red (R), green (G), and blue (B). The color matrix circuit performs color correction (control of the depth of color).

FIG. 2 illustrates a contrast-adjusting operation within a dynamic range in the configuration shown in FIG. 1. In FIG. 2, "a" is a waveform obtained when black-correction processing is performed for a digital luminance signal; and "b" is a waveform obtained when black-correction processing and contrast-control processing (contrast-gain increasing processing) are performed. In this example, the A/D converter 3 in FIG. 1 has a dynamic range in which, for example, the highest gray-scale level 255 when it is expressed by 8-bit data is an upper limit of the maximum brightness level, and the lowest gray scale level 0 is the minimum brightness level. In this case, the upper limit "255" of the dynamic range is a white level, and the lower limit "0" is a black level. Within the range of an average brightness level greater than or equal to the given value, black-correction processing offsets a digital luminance signal to the minus level side to decrease brightness, which permits a white level within a dynamic range to have a given margin (waveform a). For the first embodiment, the quantity of offset is the quantity that corresponds to the average brightness level value. In contrast-control processing (contrast-gain increasing processing), it is associated with the brightness level decreased by black-correction processing, that is, a black-correction level. In other words, in the first embodiment, contrast gain is increased within a dynamic range to eliminate the margin (waveform b).

FIG. 3 illustrates the quantity of offset to the minus level side of a luminance signal corresponding to the average brightness level value (APL value). Thus FIG. 3 illustrates the relationship between a black-correction level and the APL value. In FIG. 3, the black correction (offset to the minus side) is performed within a range of an average brightness level value (APL value) greater than or equal to a given value APL0. If the APL value is APL0, correction of the black-correction level (the quantity of offset to the minus side) B0 is performed. Then, the black-correction level is increased as the APL value increases in the following manner: if the APL value is APL1, the black-correction level is increased to B1; if the APL value is APL2, the black-correction level is increased to B2; if the APL value is APL3, the black-correction level is increased to B3; and if the APL value is APL4, at which the average brightness level value becomes a white level, the black-correction level is increased to B4, the highest black-correction level. In FIG. 1, microcomputer 8 performs black-correction processing by controlling variable-brightness circuit 6 based on information about the average brightness level.

Thus, the microcomputer controls a black-correction level predetermined according to an APL value, that is, the variable magnitude of brightness. As a result, black correction which is more stable and provides an excellent image, is realized.

FIG. 4 illustrates the relationship between a black-correction level in black-correction processing and a contrast gain in the contrast gain control. In FIG. 4, (1) is an example of properties observed in the following control operation. Although the black-correction level, that is, the quantity of offset to the minus side of a luminance signal, does not reach a given level (starting level of contrast control), the contrast gain is kept to zero. As soon as the black-correction level reaches the given level (the starting level of contrast control), a contrast gain of a given value is generated; and within the range of the black-correction level that is greater than or equal to the given level, the contrast gain increases as the black-correction level increases. Microcomputer 8 controls the contrast gain according to this example of properties. As for the properties in FIG. 3, when the APL value becomes APL2 and the black-correction level reaches B2, for example, the increase in contrast gain starts from black-correction level B2, which is the starting level of contrast control. In addition, (2) is an example of properties observed in the following control: irrespective of the value of a black-correction level, even though the quantity of offset to the minus side of a luminance signal is low enough not to reach a given level, a contrast gain of a given value is generated, and the contrast gain increases as the black-correction level increases. As for the properties in FIG. 3, when the APL value becomes APL0 and consequently enters a black-correction level, an increase in contrast gain is started. In examples (1) and (2), when the black-correction level is at the maximum level, contrast gain is also maximized. Although the contrast gain is rectilinearly changed relative to the black-correction level in the examples of properties (1) and (2), the present invention is not limited to the above.

FIG. 5 illustrates an embodiment of the configuration shown in FIG. 1. FIG. 5 shows a contrast-adjusting circuit 1, a display unit 2 comprising a PDP or a liquid crystal panel which display an image, an input terminal T1 for inputting an analog luminance signal Ya, an A/D converter 12 for converting inputted analog luminance signal Ya into a digital luminance signal Yd, a scan converter 13 for converting timing of an input signal into timing by which display unit 2 can display the signal, a variable-brightness circuit 31 which offsets digital luminance signal Yd to change its brightness level (equivalent to reference numeral 6 in FIG. 1), and a color matrix circuit 32 that converts digital luminance signal Yd and digital color (color difference) signals Cbd, Crd into digital video signals Rd, Gd, Bd for red (R), green (G), and blue (B), respectively. Color matrix circuit 32 includes variable-contrast-gain circuit 7 shown in FIG. 1. T2 and T3 are input terminals of analog color (color difference) signals Cb, Cr. An A/D converter 14 converts the analog color (color difference) signals Cb, Cr into digital color (color difference) signals Cbd, Crd. Noise-removing LPF 15 is a low-pass filter for removing noise from the digital luminance signal Yd obtained by A/D converter 12. An average-brightness detecting circuit 16 detects the average brightness level of an output signal (digital luminance signal) output from noise-removing LPF 15 during a given period, for example, in one frame or in one field. An average-brightness-determining unit 17 inputs information (signals) about the average brightness level detected by average-brightness detecting circuit 16 to find an area of brightness corresponding to the average brightness level. A gain controller 18 generates and outputs a control signal for controlling variable-brightness circuit 31 and color matrix circuit 32 based on information about an area of brightness corresponding to the average brightness level. Gain controller 18 performs the following control: variable-brightness circuit 31 is controlled by the control signal to perform black-correction control in variable-brightness circuit 31, more specifically, to decrease the brightness level by offsetting a digital luminance signal to the minus side so that a margin is provided between the decreased brightness level and the upper limit of a dynamic range as shown in FIG. 2. In association with the brightness level decreased by black-correction processing, that is, the black-correction level, color matrix circuit 32 is controlled to increase the contrast gain of a digital luminance signal within a dynamic range in a manner such that the margin is eliminated, thereby increasing contrast. Among the above-mentioned units, the average-brightness-determining unit 17 and the gain controller 18 are configured as microcomputer 8 in FIG. 1. A/D converters 12, 14, scan converter 13, noise-removing LPF 15, average-brightness detecting circuit 16, variable-brightness circuit 31, and color matrix circuit 32 can be embodied in a large-scale integrated circuit. Note that noise-removing LPF 15 is not required.

In the configuration shown in FIG. 5, an analog luminance signal Ya from input terminal T1 is converted into a digital luminance signal Yd by A/D converter 12 before digital luminance signal Yd is provided to scan converter 13 and noise-removing LPF 15. Noise-removing LPF 15 removes noise from digital luminance signal Yd. Then, digital luminance signal Yd is sent to average-brightness detecting circuit 16 where the average brightness level during a given period is detected. The signal of the detected average brightness level is inputted into average-brightness-determining unit 17 where the area of brightness corresponding to the detected average brightness level is verified. This area of brightness is either a high average area of brightness (high APL area), a middle average area of brightness (middle APL area), a low average area of brightness (low APL area), or an extremely low average area of brightness (extremely low APL area), for example. Information about the area of brightness which has been identified is inputted into gain controller 18.

In addition, information about the average brightness level used for finding the area of brightness is also provided from average-brightness-determining unit 17 to gain controller 18 together with information about the area of brightness. Based on the information about the area of brightness and the information about the average brightness level, gain controller 18 generates a control signal which controls variable-brightness circuit 31 and color matrix circuit 32. On the other hand, analog color (color difference) signals Cb, Cr from input terminals T2, T3 are also converted into digital (color difference) signals Cbd, Crd by A/D converter 14. After that, digital signals Cbd, Crd are inputted into scan converter 13 where the signals are subjected to pixel conversion. In color matrix circuit 32, digital luminance signal Yd and digital color (color difference) signals Cbd, Crd output from scan converter 13 are converted into digital video signals Rd, Gd, Bd of red (R), green (G), and blue (B) before digital video signals Rd, Gd, Bd are output. The outputted digital video signals Rd, Gd, Bd are then inputted into display unit 2 where digital video signals Rd, Gd, Bd are displayed as an image.

In the configuration of the first embodiment, the black-correction processing for a digital luminance signal is performed within a range of an average brightness level greater than or equal to a given value. However, the present invention is not limited to the above. Black correction may also be performed for an analog luminance signal before A/D conversion, or black-correction processing also may be performed without limiting the range of an average brightness level. According to the above, effectively using a dynamic range of a digital luminance signal enables a stable improvement in contrast.

Figure 6:
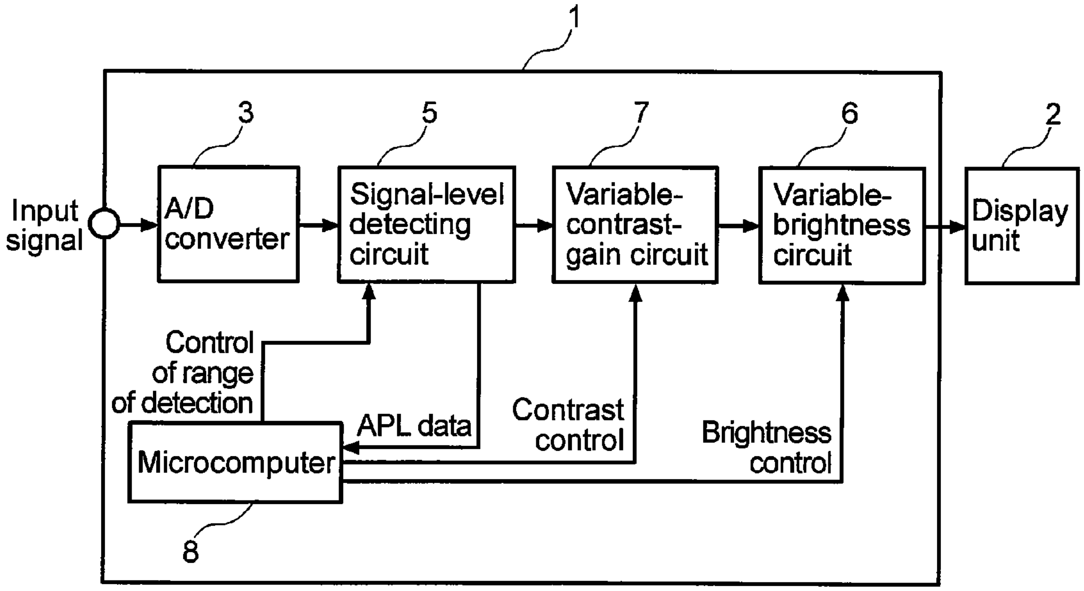
FIG. 6 is a basic configuration diagram illustrating another embodiment according to the present invention.
Figure 7:
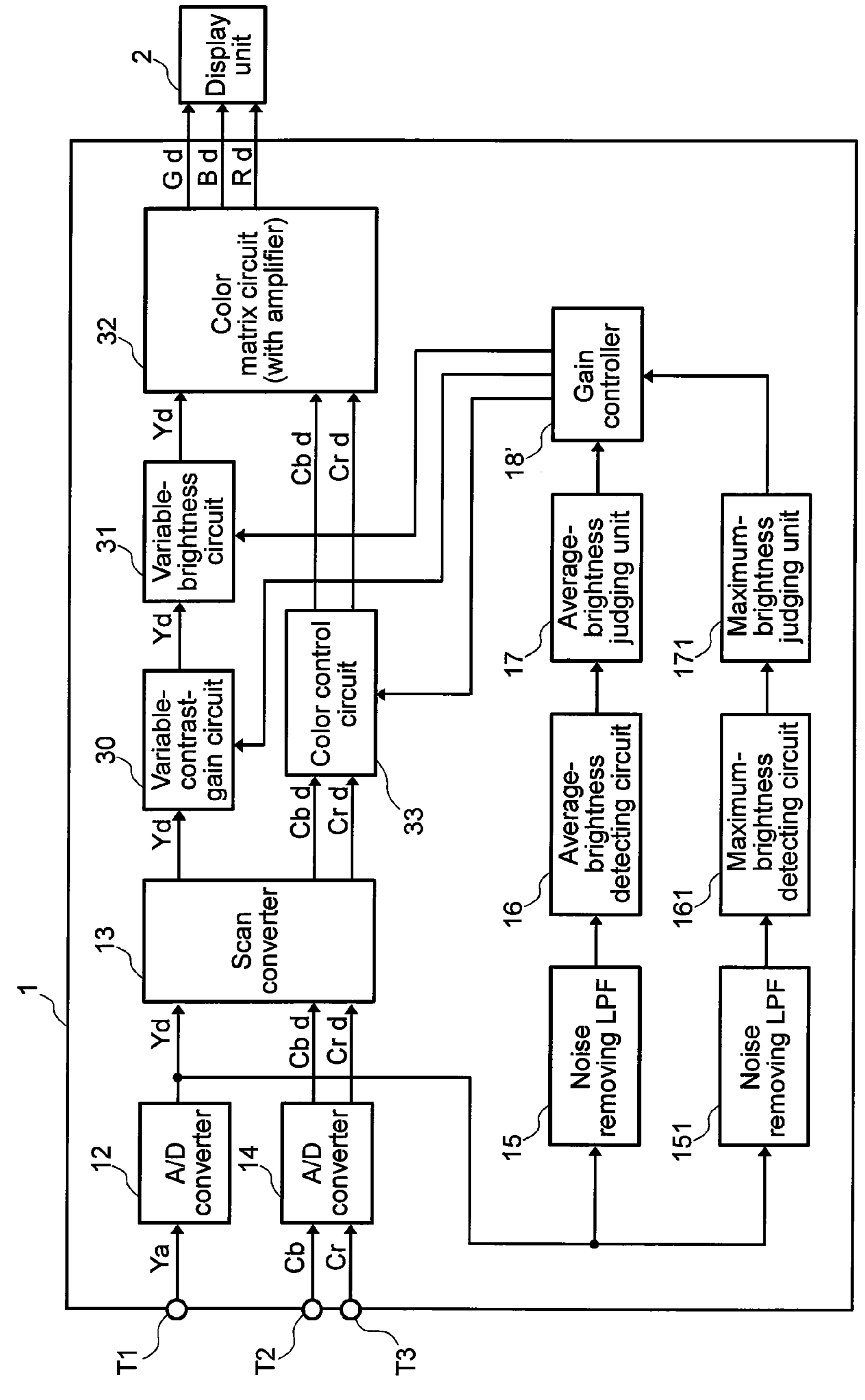
FIG. 7 is a diagram illustrating a specific example of the configuration shown in FIG. 6.
Figure 8:
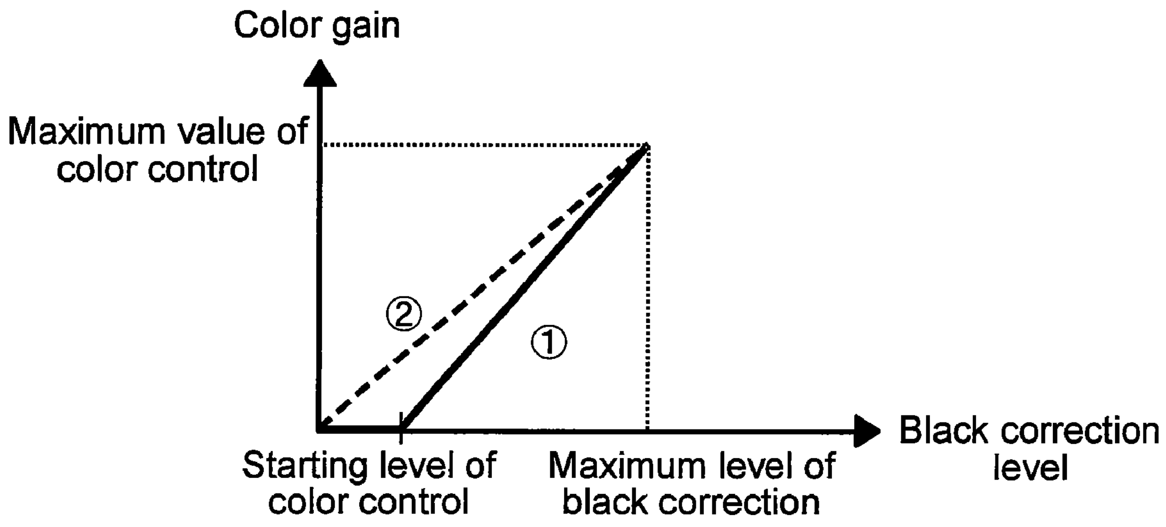
FIG. 8 is an explanatory diagram illustrating color correction in the configuration shown in FIG. 7.

FIGS. 6 through 8 illustrate other embodiments of the present invention. FIG. 6 shows an image displaying device mainly comprising a contrast-adjusting circuit. FIG. 7 illustrates a configuration of the embodiment. This embodiment has a configuration in which the contrast-adjusting circuit expects a brightness level decreased by offsetting the level to the minus side as a result of black-correction processing for a digital luminance signal, and contrast gain is increased in association therewith. Accordingly unlike the first embodiment, the variable-contrast-gain circuit is set before the variable-brightness circuit is set.

The embodiment of FIG. 6, like that of FIG. 1, includes a contrast-adjusting circuit 1, a display unit 2, an A/D converter 3, a signal-level detecting circuit 5 for detecting an average brightness level of a digital luminance signal obtained during a given period, a variable-brightness circuit 6 that offsets a digital luminance signal to change its brightness level, a variable-contrast-gain circuit 7 that changes a contrast gain of a digital luminance signal by expecting the brightness level to be changed, a microcomputer 8 as a control circuit that controls signal-level detecting circuit 5, variable-brightness circuit 6, and variable-contrast-gain circuit 7 based on information about the detected average brightness level. As in FIG. 1, an initial analog luminance signal is converted into a digital luminance signal by A/D converter 3 and inputted into signal-level detecting circuit 5. Signal-level detecting circuit 5 detects an average brightness level of the digital luminance signal obtained during a video period, for example, in one field or in one frame. Information (a signal) about the detected average brightness level is inputted into microcomputer 8. Microcomputer 8 identifies an area of brightness corresponding to the average brightness level based on information about the inputted average brightness level, then generates and outputs a control signal based on the result. The control signal is inputted into signal-level detecting circuit 5, variable-brightness circuit 6, and variable-contrast-gain circuit 7. For signal-level detecting circuit 5, the control signal is used to control the range of detection.

Variable-contrast-gain circuit 7 expects a level of black correction in variable-brightness circuit 6, specifically, the offset quantity of a digital luminance signal to the minus side. According to this expectation, variable-contrast-gain circuit 7 is controlled so that the contrast gain of a digital luminance signal is increased within a dynamic range.

In this case, for example, to prevent a digital luminance signal from exceeding the dynamic range of variable-contrast-gain circuit 7 and variable-brightness circuit 6 as a result of the increase in contrast gain, the number of gray-scale bits of a digital luminance signal may be made higher than that of A/D converter 3, which is set at a level before those circuits. Black-correction control of a digital luminance signal is performed to control variable brightness circuit 6. Specifically, variable-brightness circuit 6 is controlled so that a digital luminance signal is offset to the minus side. Control of variable-brightness circuit 6 and variable-contrast-gain circuit 7 is by a feedforward method, and is performed within a range of an average brightness level greater than or equal to a given value. This causes video contrast, particularly contrast on the bright video side, to increase. A video signal whose contrast gain has been increased in the contrast-adjusting circuit 1, is transmitted to display unit 2 where the image having increased contrast is displayed. Note that in this embodiment, a control signal is separately output from microcomputer 8 to the color matrix circuits which converts a digital luminance signal and a digital color (color-difference) signal into digital video signals of red (R), green (G), and blue (B). The color matrix circuit corrects color (controls depth of color).

FIG. 7 illustrates an embodiment of the above-mentioned configuration shown in FIG. 6. FIG. 7 shows a variable-contrast-gain circuit 30 for changing the contrast gain of a digital luminance signal Yd (and is equivalent to element 7 in FIG. 6), a variable-brightness circuit 31 which offsets digital luminance signal Yd to change its brightness level (equivalent to element 6 in FIG. 6), and a gain controller 18' for generating a control signal to control variable-contrast-gain circuit 30 and variable-brightness circuit 31, based on information about the area of brightness corresponding to the average brightness level. Gain controller 18' controls variable-contrast-gain circuit 30 by a control signal; more specifically, gain controller 18' expects the brightness level to be decreased by offsetting it to the minus side by black-correction processing, and increases contrast gain within a dynamic range in association with the expectation. As described in FIG. 6, for example, to prevent a digital luminance signal from exceeding the dynamic range of variable-contrast-gain circuit 30 and variable-brightness circuit 31 as a result of the increase in contrast gain, the number of gray-scale bits of a digital luminance signal may be made higher than that of the A/D converter, which is set at a level before those circuits. In addition, gain controller 18' controls variable-brightness circuit 31 performing black-correction control in the variable-brightness circuit, more specifically, offsetting the digital luminance signal to the minus side, so that the brightness level is decreased. Video contrast is increased by a combination of increase in contrast gain of the digital luminance signal and offset of the digital luminance signal to the minus side. In this connection, color control 33, a noise-removing LPF 151, a maximum-brightness detecting circuit 161, and a maximum-brightness-determining unit 171 are provided as additional elements, but can also be omitted. Therefore, they will be described later. The other elements are similar to those in the first embodiment shown in FIG. 5.

In the configuration shown in FIG. 7, average-brightness-determining unit 17 and gain controller 18' are configured as microcomputer 8 in FIG. 6; and A/D converters 12, 14, scan converter 13, noise-removing LPF 15, average-brightness detecting circuit 16, variable-contrast-gain circuit 30, variable-brightness circuit 31, and color matrix circuit 32 are configured as, for example, an LSI circuit.

In the embodiment described above black-correction processing and contrast-gain increasing processing for the digital luminance signal are performed within the range of an average brightness level greater than or equal to a given value. However, the present invention is not limited to the above. Black-correction also may be performed for an analog luminance signal before the A/D conversion, or it may be performed without limiting the range of an average brightness level. Effectively using the dynamic range of a digital luminance signal with the above-mentioned configuration makes stable video contrast improvement possible.

Next, element 33, which performs additional color correction, is described. Element 33 is a color control circuit that corrects the color of digital (color difference) signals Cbd, Crd output from scan converter 13. More specifically, based on information about the average brightness level detected by the average-brightness-detecting circuit and information about the area of brightness corresponding to the average brightness level, gain controller 18' controls variable-contrast-gain circuit 30 and variable-brightness circuit 31 to increase contrast, and also controls color control circuit 33 to perform the color correction. Color control circuit 33 is also configured as, for example, an LSI (large-scale integration).

When adjusting contrast, a gain is increased only for a luminance signal. Accordingly, the depth of video color decreases as a contrast gain associated with the black-correction level increases. In this embodiment, color correction is performed as a preventive measure. More specifically, the depth of video color is increased according to the increase in contrast gain associated with a black-correction level. The color correction is controlled by microcomputer 8 according to, for example, properties (1) or (2) in FIG. 8. Properties (1) are used in the following control process: color correction is not performed until a black-correction level reaches a given color-correction starting level; within a range allowed after the black-correction level reaches the color-correction starting level; the color-correction gain is substantially increased in proportion to the black-correction-level value; and the highest color gain is provided at the highest black-correction level. Properties (2) are used in the following control process: the given color-correction starting level is not provided as a black-correction level; the color-correction gain is substantially increased in proportion to the black-correction level value; and the highest color gain is provided at the highest black-correction level. This can prevent the depth of color from decreasing when adjusting contrast. Although the gain of color correction is rectilinearly changed relative to the black-correction level in the examples of properties (1) and (2), the present invention is not limited to the above.

According to the configuration in the embodiment, video contrast can be improved by effectively using the dynamic range of a digital luminance signal, and it is also possible to prevent the depth of color from decreasing when improving the contrast.

Additional elements 151, 161, 171 are now described. FIG. 7 shows a noise-removing LPF that is one of low-pass filters for removing noise from digital luminance signal Yd obtained by A/D converter 12; a maximum-brightness detecting circuit for detecting the maximum brightness level of an output signal (digital luminance signal) of noise-removing LPF 151 during a given period of time, for example, in one frame or in one field; and a maximum-brightness-determining unit that inputs information (a signal) about the maximum brightness level detected by maximum-brightness detecting circuit 161 to identify a bright area corresponding to the maximum brightness level. A gain controller 18' generates and outputs a control signal which controls variable-contrast-gain circuit 30, variable-brightness circuit 31, and color control circuit 33, based on information about the area of brightness corresponding to the maximum brightness level, information about the area of brightness corresponding to the average brightness level, and information about the average brightness level.

In the above-mentioned configuration, an analog luminance signal Ya from input terminal T1 is converted to digital luminance signal Yd by A/D converter 12. Digital luminance signal Yd is inputted into scan converter 13 and also into noise-removing LPFs 15, 151. After the noise-removing LPFs 15, 151 remove noise, digital luminance signal Yd is inputted into average-brightness detecting circuit 16 and maximum-brightness detecting circuit 161. In average-brightness detecting circuit 16, the average brightness level during a given period is detected. In maximum-brightness detecting circuit 161, the maximum brightness level is detected. The pieces of information about the average brightness level and the information about the maximum brightness level, which have been detected, are inputted into average-brightness-determining unit 17 and maximum-brightness-determining unit 171, respectively. Average-brightness-determining unit 17 identifies an area of brightness corresponding to the detected average brightness level. Maximum-brightness-determining unit 171 identifies an area of brightness corresponding to the detected maximum brightness level. More specifically, an average brightness area corresponding to the detected average brightness level is identified. This average brightness area is, for example, one of four average brightness areas: a high average-brightness area (high APL area), a middle average-brightness area (middle APL area), a low average-brightness area (low APL area), and an extremely low average-brightness area (extremely low APL area). In addition, an area corresponding to the detected maximum brightness level is also identified. This area is, for example, one of three maximum areas of brightness: a saturation brightness area (saturation MAX area), a high brightness area (high MAX area), and a low brightness area (low MAX area). The information about the area of brightness corresponding to the average brightness level and the information about the area of brightness corresponding to the maximum brightness level, which have been identified, are supplied to gain controller 18'. In addition, the average brightness level used to identify the area is also provided together with information from average-brightness-determining unit 17. Based on information about the area of brightness and information about the average brightness level, gain controller 18' generates a control signal which controls variable-contrast-gain circuit 30, variable-brightness circuit 31, and color control circuit 33.

According to the configuration in the embodiment, it is possible to obtain stable high contrast, and a decrease in the depth of color can be prevented. In this connection, in each configuration of the embodiments, within a range of an average brightness level greater than or equal to a given value, black-correction processing and contrast-gain-increasing processing are performed for a digital luminance signal after the A/D conversion. However, the present invention is not limited to the above. Either or both of black-correction processing and contrast-gain-increasing processing also may be carried out on an analog luminance signal before the A/D conversion. Further processing may be performed without limiting the range of an average brightness level.

This invention provides stable high contrast by detecting an average brightness level to control the contrast gain of a luminance signal, and by black correction using a predetermined quantity of correction according to the average brightness level. The depth of video color can also be improved.

What is claimed is:

1. An image display apparatus comprising:

a fixed pixel display device which displays an image based on an input video signal to the image display apparatus;

a detector which detects brightness information of the input video signal;

a black correction processor which performs a black correction to the input video signal based on the detected brightness information of the input video signal so as to obtain a margin between the input video signal and an upper limit of a dynamic range, wherein the black correction processor increases a quantity of the black correction according to the detected brightness information if a level of the detected brightness information is equal to or greater than a predetermined value, wherein the black correction processor does not perform black correction if the level of the detected brightness information is less than the predetermined value;

a contrast controller which controls a contrast of the input video signal; and a controller which controls the contrast controller so as to control the contrast of the input video signal according to the margin obtained by the black correction in the black correction processor if the quantity of the black correction is equal to or greater than a predetermined value.

2. The image display apparatus according to claim 1, wherein the fixed pixel display device is a plasma display panel or a liquid crystal display panel.

3. The image display apparatus according to claim 1, wherein the brightness information is an average picture level while one field or frame of the video signal.

4. The image display apparatus according to claim 1, wherein the contrast controller controls to increase the contrast within a dynamic range.

5. The image display apparatus according to claim 4, wherein the dynamic range is expanded by the black correction processor.

6. The image display apparatus according to claim 1, further comprising: a color correction processor which performs a color correction to the video signal.

7. The image display apparatus according to claim 6, wherein the color correction processor performs the color correction according to the quantity of the black correction in the black correction processor.

8. The image display apparatus according to claim 6, wherein the color correction processor performs the color correction when the quantity of the black correction in the black correction processor is equal to or greater than a predetermined value.

9. The image display apparatus according to claim 3, wherein the black correction processor increase the quantity of the black correction according to the increasing the average picture level of the video signal.

10. The image display apparatus according to claim 1, wherein the contrast controller increases the contrast of the video signal when the quantity of the black correction in the black correction processor is equal to or greater than a predetermined value.

11. The image display apparatus according to claim 3, wherein the controller has a control characteristic of quantity of the black correction to the average picture level, a first rate of change of the control characteristic within a first brightness range is greater than a second rate of change of the control characteristic within a second brightness range, wherein the second brightness range is higher than the first brightness range, the controller controls the black correction processor using such control characteristic.

12. The image display apparatus according to claim 1, wherein the black correction processor performs the black correction to decrease a brightness of the video signal according to a minus offset for the video signal.

* * * * *